US011284318B2

United States Patent
Shi et al.

(10) Patent No.: US 11,284,318 B2
(45) Date of Patent: *Mar. 22, 2022

(54) CELLULAR SYSTEM SELECTION FREQUENCY SCAN SCOPE

(71) Applicant: Apple Inc., Cupertino, CA (US)

(72) Inventors: Jianxiong Shi, Dublin, CA (US); Lakshmi N. Kavuri, San Jose, CA (US); Madhusudan Chaudhary, Campbell, CA (US); Thanigaivelu Elangovan, Santa Clara, CA (US); Viswanath Nagarajan, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/806,217

(22) Filed: Mar. 2, 2020

(65) Prior Publication Data

US 2020/0205038 A1 Jun. 25, 2020

Related U.S. Application Data

(63) Continuation of application No. 16/372,263, filed on Apr. 1, 2019, now Pat. No. 10,609,600, which is a (Continued)

(51) Int. Cl.
*H04W 36/00* (2009.01)
*H04J 11/00* (2006.01)
(Continued)

(52) U.S. Cl.
CPC ..... *H04W 36/0085* (2018.08); *H04J 11/0069* (2013.01); *H04W 36/32* (2013.01); (Continued)

(58) Field of Classification Search
CPC . H04W 36/0085; H04W 36/32; H04W 36/36; H04W 48/16; H04W 48/18; H04W 36/0088; H04W 48/08; H04J 11/0069
See application file for complete search history.

(56) References Cited

U.S. PATENT DOCUMENTS 7,379,748 B2   5/2008   Jansen
8,311,497 B2   11/2012  Keshav et al.
(Continued)

FOREIGN PATENT DOCUMENTS

KR   1020000003009   1/2000
KR   1020070036380   4/2007
KR   1020160005355   1/2016

OTHER PUBLICATIONS

Notice of Allowance, Korean Patent Application No. 10-2017-0106675, dated Jul. 17, 2018, 3 pages.

*Primary Examiner* — Benjamin H Elliott, IV
(74) *Attorney, Agent, or Firm* — Kowert, Hood, Munyon, Rankin & Goetzel, P.C.

(57) ABSTRACT

Apparatuses, systems, and methods for user equipment (UE) devices to perform more efficient frequency scans for potential base stations. According to techniques described herein, the UE may determine that it does not have cellular service and determine first information based on a last camped cell. A time period during which the first information was acquired may be determined and one or more frequency scans may be performed. The frequency scans may be limited to a set of frequencies based in part on the time period. Thus, if the time period is less than a first value, the set of frequencies may include a first set of frequencies and if the time period is greater than the first value but less than a second value, the set of frequencies may include the first set of frequencies and a second set of frequencies.

20 Claims, 5 Drawing Sheets

Related U.S. Application Data continuation of application No. 15/590,127, filed on May 9, 2017, now Pat. No. 10,251,095.

(60) Provisional application No. 62/380,305, filed on Aug. 26, 2016.

(51) Int. Cl.
  *H04W 36/32* (2009.01)
  *H04W 36/36* (2009.01)
  *H04W 48/16* (2009.01)
  *H04W 48/18* (2009.01)

(52) U.S. Cl.
  CPC .......... *H04W 36/36* (2013.01); *H04W 48/16* (2013.01); *H04W 48/18* (2013.01); *H04W 36/0088* (2013.01)

(56) References Cited

U.S. PATENT DOCUMENTS

| | | | |
|---|---|---|---|
| 8,744,443 B2 | 6/2014 | Buckley et al. | |
| 10,251,095 B2* | 4/2019 | Shi | H04W 36/0085 |
| 10,609,600 B2* | 3/2020 | Shi | H04W 36/32 |
| 2009/0036098 A1* | 2/2009 | Lee | H04W 48/20 |
| | | | 455/411 |
| 2009/0156206 A1* | 6/2009 | Rathonyi | H04W 48/16 |
| | | | 455/434 |
| 2010/0020725 A1* | 1/2010 | Ha | H04W 48/16 |
| | | | 370/255 |
| 2010/0167729 A1* | 7/2010 | Kim | H04W 48/16 |
| | | | 455/434 |
| 2011/0195712 A1* | 8/2011 | Mucke | H04W 48/16 |
| | | | 455/434 |
| 2012/0258710 A1* | 10/2012 | Swaminathan | H04W 48/16 |
| | | | 455/433 |
| 2013/0053036 A1* | 2/2013 | Gong | H04W 48/16 |
| | | | 455/436 |
| 2013/0273913 A1* | 10/2013 | Swaminathan | H04W 48/16 |
| | | | 455/434 |
| 2014/0148170 A1* | 5/2014 | Damji | H04W 36/0085 |
| | | | 455/437 |
| 2014/0241184 A1* | 8/2014 | Sami | H04W 36/24 |
| | | | 370/252 |
| 2015/0004966 A1* | 1/2015 | Ayleni | H04W 60/00 |
| | | | 455/433 |
| 2015/0029949 A1* | 1/2015 | Tsai | H04W 84/12 |
| | | | 370/329 |
| 2015/0056985 A1* | 2/2015 | Swaminathan | H04W 88/06 |
| | | | 455/432.1 |
| 2016/0006531 A1* | 1/2016 | Kumar | H04J 11/0086 |
| | | | 455/434 |
| 2016/0087831 A1* | 3/2016 | Shah | H04W 24/04 |
| | | | 455/424 |
| 2016/0309399 A1* | 10/2016 | Swaminathan | H04W 52/0216 |
| 2016/0309400 A1* | 10/2016 | Swaminathan | H04W 48/16 |
| 2016/0345245 A1* | 11/2016 | Chuttani | H04W 4/025 |
| 2018/0063751 A1* | 3/2018 | Shi | H04W 48/16 |
| 2019/0230561 A1* | 7/2019 | Shi | H04W 48/16 |
| 2020/0205038 A1* | 6/2020 | Shi | H04W 36/0085 |

* cited by examiner

CELLULAR SYSTEM SELECTION FREQUENCY SCAN SCOPE

PRIORITY DATA

This application is a continuation of U.S. patent application Ser. No. 16/372,263, titled "Cellular System Selection Frequency Scan Scope", filed Apr. 1, 2019, which claim benefit of priority to U.S. patent application Ser. No. 15/590,127, titled "Cellular System Selection Frequency Scan Scope", filed May 9, 2017, now U.S. Pat. No. 10,251,095, which claims benefit of priority to U.S. Provisional Application Ser. No. 62/380,305, titled "Cellular System Selection Frequency Scan Scope", filed Aug. 26, 2016, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to an apparatus, system, and method for wireless devices to perform cellular system selection during limited service and/or for connected mode out of service recovery.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios, a wireless device may use a search algorithm to acquire service with a wireless network. These search algorithms may burden device resources. Thus, improvements in the field are desired.

SUMMARY

Embodiments are presented herein of methods for wireless devices to more efficiently scan frequency bands for potential base stations and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, the UE, or a processor of the UE (e.g., such as a baseband processor), may determine that the UE does not have cellular service and determine first information based on a last cell the UE camped on. The UE may also determine a time period during which the first information was acquired and perform one or more frequency scans limited to a set of frequencies based in part on the time period. In some embodiments, to determine the time period, the UE may determine whether the time period is less than a first value, where if the time period is less than the first value, the set of frequencies may include a first set of frequencies, where if the time period is greater than the first value but less than a second value, the set of frequencies may include the first set of frequencies and a second set of frequencies, where if the time period is greater than the second value, the set of frequencies may include the first and second sets of frequencies and a third set of frequencies.

Further, according to the techniques described herein, the UE, or a processor of the UE (e.g., such as a baseband processor), may determine that the UE does not have cellular service and determine first information based on a last cell the UE was camped on. In addition, the UE may determine a time period during which the first information was acquired and perform one or more frequency scans limited to a set of frequencies based, at least in part on the time period, wherein if the time period is less than a first value, the set of frequencies comprise frequencies stored on the UE in local acquisition database (ACQ-DB) such as local and local enhanced ACQ-DBs and/or assisted local and local enhanced ACQ-DBs. In some embodiments, if the time period is less than the first value, the set of frequencies may include a first set of frequencies, where if the time period is greater than the first value but less than a second value, the set of frequencies may include the first set of frequencies and a second set of frequencies, where if the time period is greater than the second value, the set of frequencies may include the first and second sets of frequencies and a third set of frequencies.

In addition, according to the techniques described herein, the UE, or a processor of the UE (e.g., such as a baseband processor) may determine that the UE does not have cellular service and determine whether first information associated with a last cell the UE camped on was acquired within a first time period. The UE may, in response to determining that the first information was acquired within the first time period, perform one or more frequency scans limited to a first set of frequencies. In addition, the UE may in response to determining that the first information was not acquired within the first time period, perform one or more frequency scans limited to a second set of frequencies, where the first set of frequencies is a subset of the second set of frequencies. In some embodiments, the UE may determine that the first information was not acquired within a second time period, where the second time period is greater than the first time period, and in response to determining that the first information was not acquired within the second time period, perform one or more frequency scans limited to a third set of frequencies, where the second set of frequencies is a subset of the third set of frequencies.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
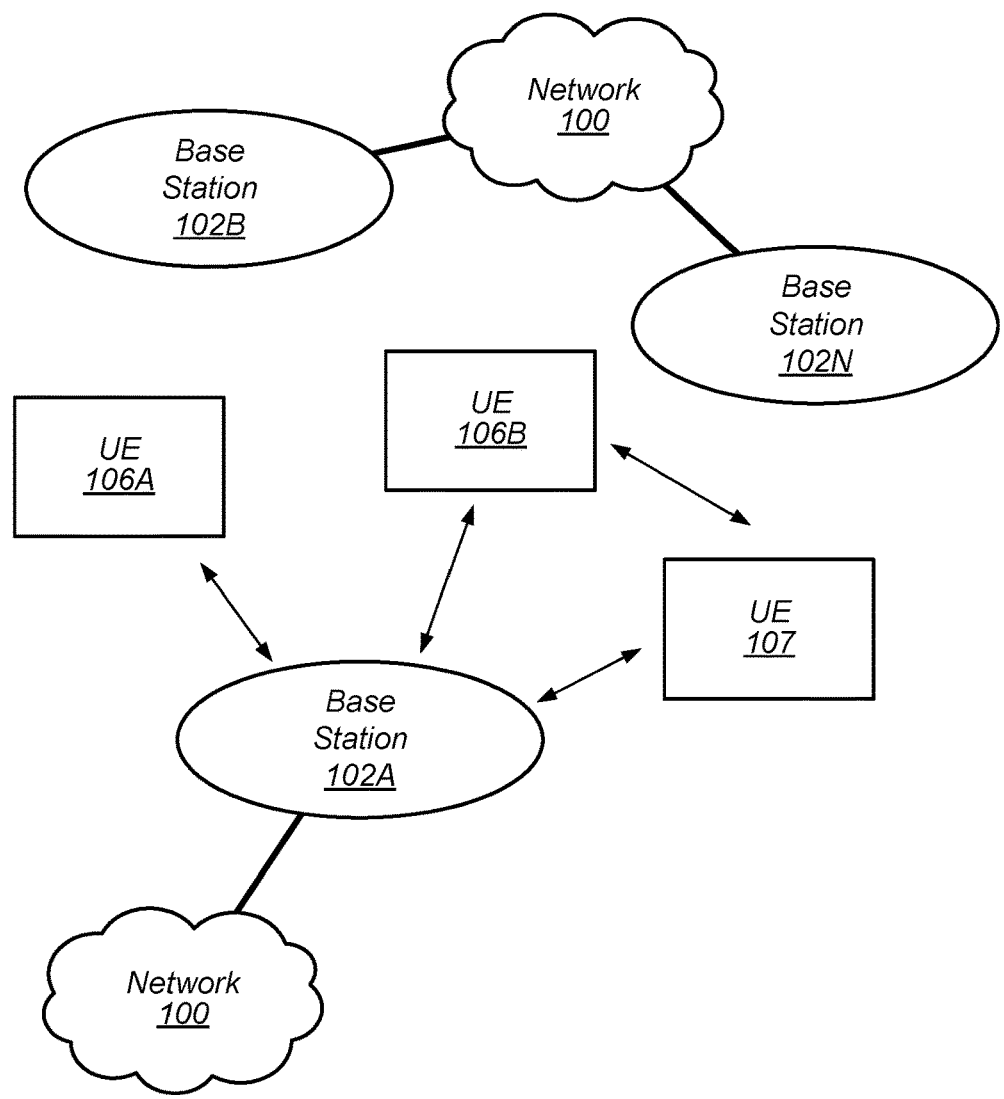
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
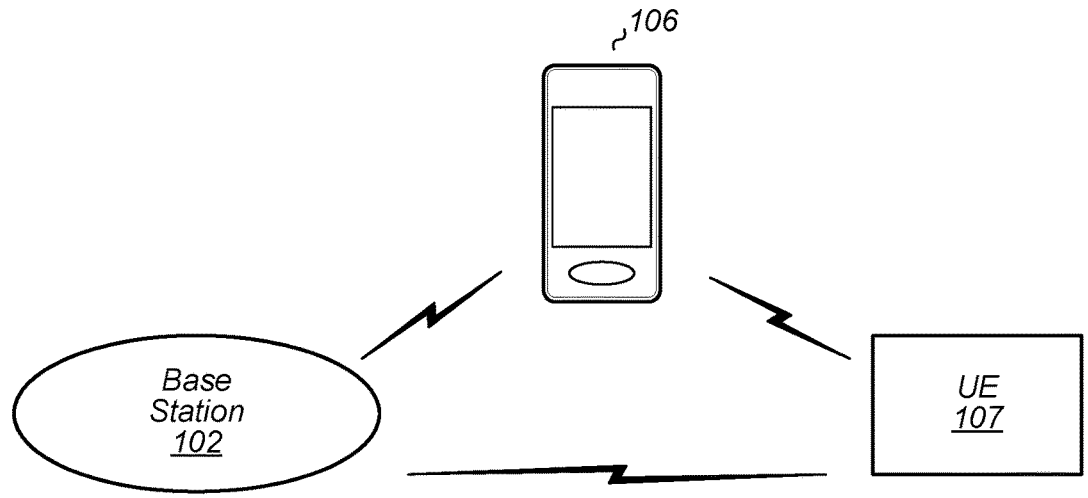
FIG. 2 illustrates an example system in which a UE can selectively either directly communicate with a cellular base station or utilize the cellular capabilities of a companion or proxy device such as another UE, according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more wireless devices 106A, 106B, etc., as well as accessory device (or accessory UE) 107. Wireless devices 106A, 106B, and 107 may be user devices, which may be referred to herein as "user equipment" (UE) or UE devices.

The base station (BS) 102A may be a base transceiver station (BTS) or cell site (a "cellular base station"), and may include hardware that enables wireless communication with wireless devices 106A, 106B, and 107.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as 5G new radio (5G NR), GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106/107 and similar devices over a wide geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106/107 may be capable of communicating using multiple wireless communication standards. For example, UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), 5G NR, LTE, LTE-A, HSPA, 3GPP2 CDMA2000 (e.g., 1×RTT, 1×EV-DO, HRPD, eHRPD), etc.). UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

The UEs 106A and 106B are typically handheld devices such as smart phones or tablets, but may be any of various types of device with communication capability, such as cellular communications capability. The UE 106B may be configured to communicate with the UE device 107, which may be referred to as an accessory device 107. The accessory device 107 may be any of various types of devices, typically a wearable device that has a smaller form factor, and may have limited battery, output power and/or communications abilities relative to UEs 106. In other words, accessory device 107 may be referred to as a lower power device whereas UE 106 may be referred to as a higher power device. As one common example, the UE 106B may be a smart phone carried by a user, and the accessory device 107 may be a smart watch worn by that same user, or possibly a different user. Thus, as another example, the UE 106B may be a smart phone carried by a first user, and the accessory device 107 may be a smart watch worn by a second, different user. The UE 106B and the accessory device 107 may communicate using any of various short-range communication protocols, such as Bluetooth, Wi-Fi, etc.

The accessory device 107 includes communications capability, e.g., cellular communication capability, and hence is able to directly communicate with cellular base station 102. However, since the accessory device 107 is possibly limited in one or more of its communication capabilities, output power, and/or battery, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2—Example System with Accessory Device

FIG. 2 illustrates an example accessory device 107 in communication with base station 102. The accessory device 107 may be a wearable device such as a smart watch or band. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the accessory device 107 may provide voice/data packets intended for the base station 102 over the short-range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The various embodiments herein are described with respect to the accessory device 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the accessory device 107 to selectively using either its own Wi-Fi functionality (autonomous mode) to communicate with a Wi-Fi access point, or use the Wi-Fi functionality of the UE 106 (relay mode) for Wi-Fi communications.

The accessory device 107 may include a processor that is configured to execute program instructions stored in memory. The accessory device 107 may perform any of the method embodiments described herein by executing such stored instructions. Alternatively, or in addition, the accessory device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of 5G NR, LTE (or LTE-Advanced) or Bluetooth, and separate radios for communicating using each of 5G NR, LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone, e.g., accessory device 107 may be a lower power device or link budget limited device. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities) that is not currently near a Wi-Fi hotspot and hence is not currently able to communicate over Wi-Fi with the Internet. Thus, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
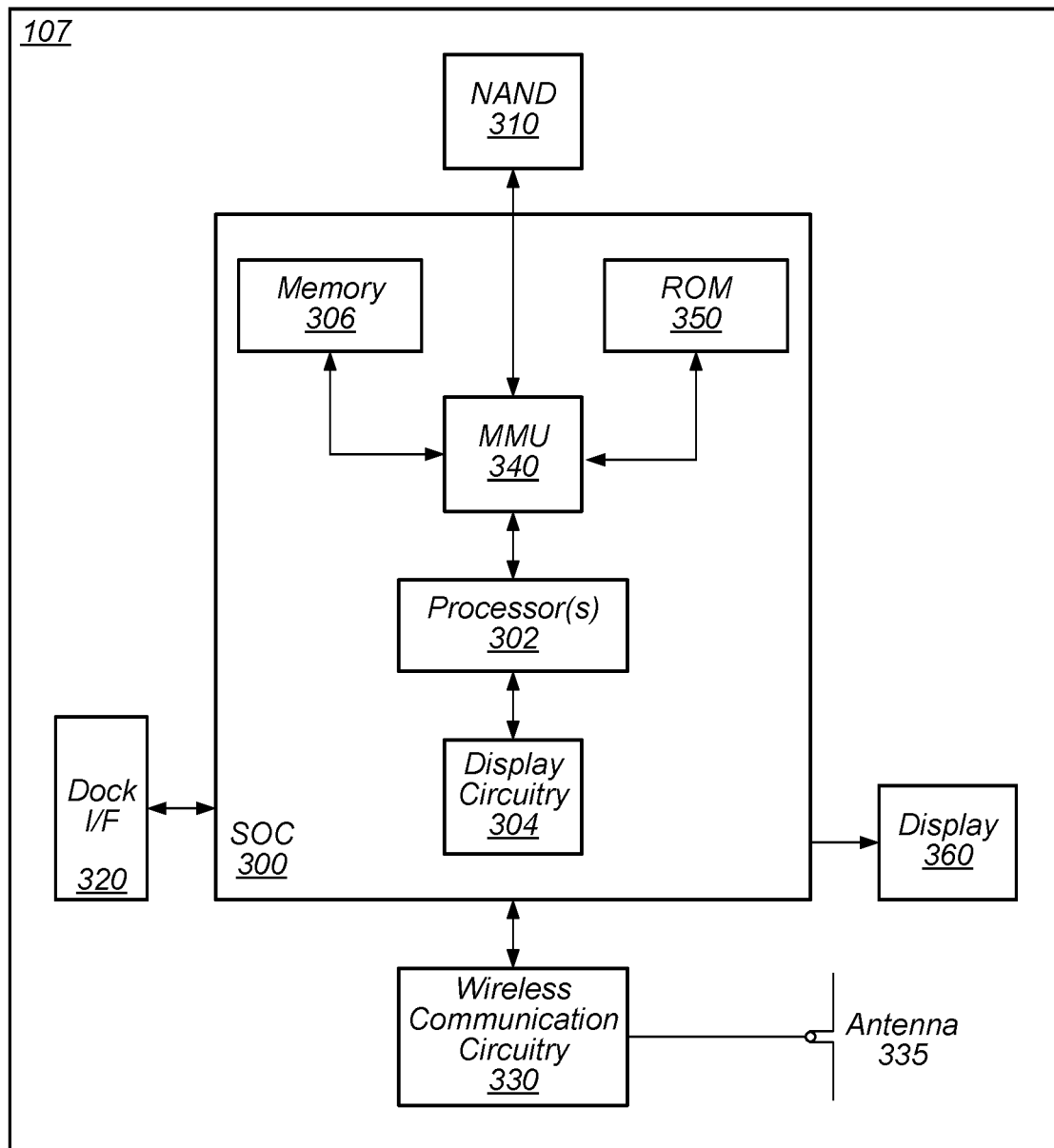
FIG. 3 illustrates an example block diagram of a UE according to some embodiments.

FIG. 3—Block Diagram of a UE

FIG. 3 illustrates an example block diagram of a UE 107, according to some embodiments. As shown, the UE 107, which may be an accessory device as described above, may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 107. For example, the UE 107 may include various types of memory (e.g., including NAND flash 310), a connector interface 320 (e.g., for coupling to a computer system, dock, charging station, etc.), the display 360, and wireless communication circuitry 330 (e.g., for 5G NR, LTE, LTE-A, CDMA2000, Bluetooth, Wi-Fi, GPS, etc.).

As shown, the UE device 107 may include at least one antenna (and possibly multiple antennas, e.g., for MIMO and/or for implementing different wireless communication technologies, among various possibilities) for performing wireless communication with base stations, access points, and/or other devices. For example, the UE device 107 may use antenna 335 to perform the wireless communication.

The UE 107 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 107 may include hardware and software components for implementing methods according to embodiments of this disclosure. The processor 302 of the UE device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 107, in conjunction with one or more of the other components 300, 304, 306, 310, 320, 330, 335, 340, 350, 360 may be configured to implement part or all of the features described herein, such as the features described herein.

Figure 4:
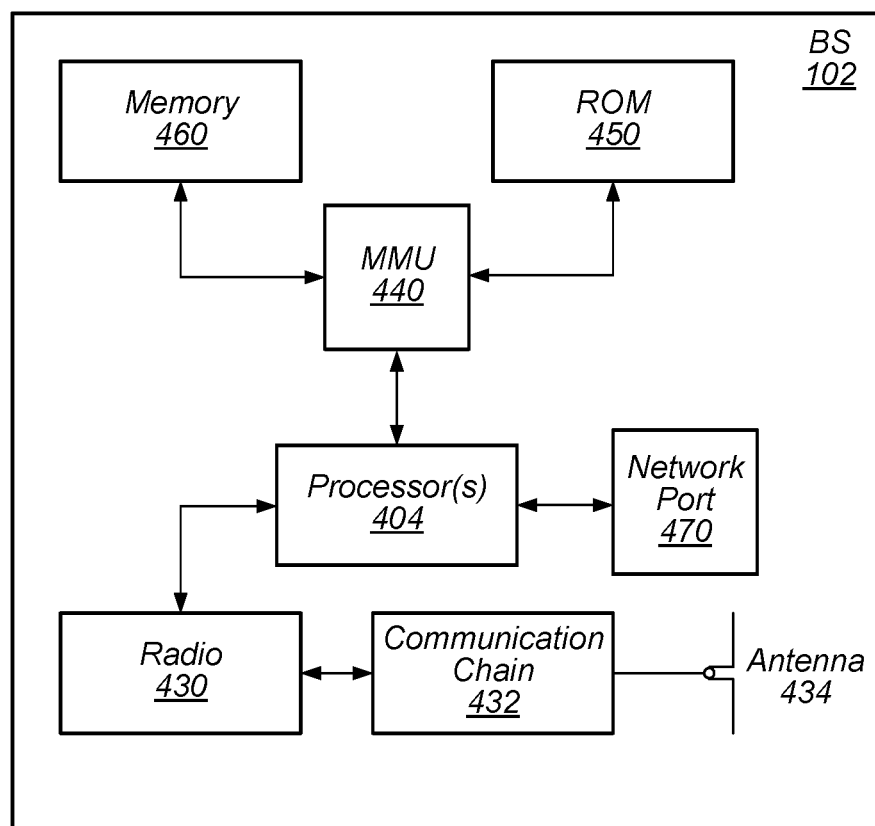
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE/5G NR radio for performing communication according to LTE/5G NR as well as a Wi-Fi radio for performing communication according to Wi-Fi. In such a case, the base station 102 may be capable of operating as both an LTE/5G NR base station and a Wi-Fi access point. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Cellular System Selection

In some existing implementations, lower power (link budget limited, or accessory) devices, e.g., such as small form factor UEs and/or wearable devices, may not be serviceable by cellular systems deployed based on higher power devices, e.g., standard sized or higher power UEs such as an iPhone or iPad. In other words, devices with RF impairment limitations (e.g., due to form factor and/or available power) may not have service at cell edges in existing deployments which are based on higher powered devices (e.g., devices without an RF impairment due to form factor and/or available power). In such implementations, lower power devices (e.g., accessory devices) may frequently lose cellular service which may trigger frequent system scans to recover the lost cellular service. At cell edges, powering on such lower power devices may also cause aggressive system scans to discover service leading to a reduction in battery charge.

In some existing implementations, a lower power (accessory) device may access various databases to determine available frequencies that the accessory device may scan to attempt to acquire service. For example, the lower power device may have access to a local acquisition database (ACQ-DB) containing a history of recently acquired systems and corresponding frequencies. The lower power device may also have access to a local enhanced acquisition database (EACQ-DB) containing neighbor frequencies received in a system information block (SIB) from recently acquired systems. In addition, a lower power device may have access to similar databases shared by a companion device (or companion UE), such as an assisted ACQ-DB (containing recently used ACQ-DB received from the companion device) or an assisted EACQ-DB (containing neighbor frequencies received in a SIB by the companion device and received from the companion device).

Further, the lower power device may have access to databases based on the location (e.g., location assisted databases) of the lower power device, including information identifying frequencies on which cells may be deployed. For example, a first database (e.g., LOC-ASSIST-DB-R1) may include all frequencies corresponding to a first radius (e.g., 25 kilometers) about the location of the lower power device and a second database (e.g., LOC-ASSIST-DB-R2) may include all frequencies corresponding to a second radius (e.g., 50 kilometers) about the location of the lower power device. Note that radii of 25 kilometers and 50 kilometers are merely exemplary, and other radii are contemplated, e.g., 10 kilometers and 20 kilometers, 20 kilometers and 30 kilometers, 30 kilometers and 50 kilometers, and so forth.

In addition, the lower power device may also have access to a public land mobile network (PLMN) database that includes all deployed frequencies for the PLMN by a cellular operator. Thus, the lower power device may have a wide range of frequencies that are available for scanning, however, due to limited power resources, scanning all available frequencies may not be practical and/or possible. In addition, due to power restrictions/limitations, not all frequencies deployed may be useable by the lower power device.

Embodiments describe herein relate to techniques for regaining service via initial selection of a limited scan scope and progressively limiting scan scope as information regarding available frequencies is obtained.

Scan Scope

In some embodiments, scan scope may be based, at least in part, on previous camped information and a timeliness of the previous camped information. In other words, a scope of frequencies to be scanned to acquire and/or re-acquire service may be based on information obtained from a most recent cell (or cellular system/PLMN) a device (e.g., such as UEs 106 and 107 described above) was camped on, e.g., if the information was acquired within a specified time frame, e.g., within 2 hours, 3 hours, 4 hours, 8 hours, and so forth.

For example, if the device has last camped cell identifier (ID) information that was acquired within a recent time frame, e.g., the information is less than two hours old (note that two hours is merely an example, and other time frames are contemplated, e.g., less than 15 minutes, less than 30 minutes, less than 45 minutes, less than 1 hour, less than 1.5 hours, less than 3 hours, less than 4 hours, and so forth), the device may limit an initial scan scope to local and assisted ACQ-DBs and EACQ-DBs and location assisted databases, e.g., a first database (e.g., LOC-ASSIST-DB-R1) corresponding to a first radius about the location of the device and a second database (e.g., LOC-ASSIST-DB-R2) corresponding to second radius about the location of the device. In other words, the device may limit an initial scan scope to recently acquired systems and corresponding frequencies and neighbor cell frequencies based on local databases and databases shared by a companion UE as well as cell frequencies based on location based databases. In some embodiments, the device may not perform band scans by assuming that the device is still within a boundary of the last camped cell and may further assume that an RF impairment caused the loss of cellular service. In some embodiments, the device may prioritize home PLMN frequencies for scanning followed by frequencies found in a first location assisted database (e.g., LOC-ASSIST-DB-R1), ACQ-DB frequencies, EACQ-DB frequencies, and then frequencies found in a second location assisted database (e.g., LOC-ASSIST-DB-R2) encompassing a larger region than the first location assisted database.

As another example, if the device has last camped cell ID information that was acquired within a less recent time frame, e.g., the information is more than three hours old (note that three hours is merely an example, and other time frames are contemplated, e.g., more than 15 minutes, more than 30 minutes, more than 45 minutes, more than 1 hour, more than 1.5 hours, more than 2 hours, more than 4 hours, and so forth), the device may limit the initial scan scope to local ACQ-DB and EACQ-DB as well as PLMN-DB. In other words, the device may limit an initial scan scope to recently acquired systems and corresponding frequencies and neighbor cell frequencies based on local databases as well as cell frequencies based on location based databases and PLMN database (DB) frequencies corresponding to preferred PLMN's (PPLMN) frequencies of the last known country. In some embodiments, the device may not perform band scans by assuming that the device is still within a boundary of the last camped cell and may further assume that an RF impairment caused the loss of cellular service. In some embodiments, the device may prioritize home PLMN (HPLMN) frequencies for scanning followed by frequencies found in a first location assisted database (e.g., LOC-ASSIST-DB-R1, ACQ-DB, EACQ-DB), a second location assisted database (e.g., LOC-ASSIST-DB-R2) encompassing a larger region than the first location assisted database, and PLMN-DB frequencies corresponding to PPLMN's frequencies. In some embodiments, once the device discovers a cell (e.g., has a known cell ID information that was acquired within the recent time frame), the device may refresh location assisted databases and redefine scan scope accordingly, e.g., the device may limit the scan scope to local and assisted ACQ-DBs and EACQ-DBs and location assisted databases, e.g., LOC-ASSIST-DB-R1 and LOC-ASSIST-DB-R2.

In yet another example, if the device has last camped cell ID that was not acquired recent time frame, e.g., the information is more than eight hours old (note that eight hours is merely an example, and other time frames are contemplated, e.g., more than 1 hour, more than 2 hours, more than 3 hours, more than 4 hours, more than 5 hours, more than 6 hours, more than 7 hours, more than 9 hours, more than 10 hours, more than 11 hours, more than half a day, more than a day, and so forth), or if the device has no prior knowledge of location, the device may expand an initial scan scope to ACQ-DB and EACQ-DB, LOC-ASSIST-DB-R1, LOC-ASSIST-DB-R2, PLMN-DB (HPLMN/PPLMN) frequencies based on the information (if any), followed by band scan on preferred RAT/band combinations followed by band scan on other RAT's. In some embodiments, the device may not perform band scans by assuming that the device is still within a boundary of the last camped cell and may further assume that an RF impairment caused the loss of cellular service. In some embodiments, the device may prioritize the HPLMN frequencies followed by frequencies in the order of LOC-ASSIST-DB-R1, ACQ-DB and EACQ-DB, LOC-ASSIST-DB-R2, and PLMN-DB. In addition, the device may prioritize band scan on widely deployed RAT/band combinations. In some embodiments, once the device discovers a cell (e.g., has a known cell ID information that was acquired within the recent time frame), the device may refresh databases (e.g., location assisted databases) and redefine scan scope accordingly, e.g., the device may limit the scan scope to local and assisted ACQ-DBs and EACQ-DBs and location assisted databases, e.g., LOC-ASSIST-DB-R1 and LOC-ASSIST-DB-R2.

In some embodiments, the device may prefer a most recent ACQ-DB among local ACQ-DB and assisted ACQ-DB. In addition, the device may prefer a most recent EACQ-DB among local EACQ-DB and assisted EACQ-DB. In other words, the device may prefer a database provided from a companion device if the database has a more recent timestamp than a corresponding local database.

In some embodiments, if a device is in (or remains in) a continuous "No service" state, the device may change the initial scan scope by moving from a first state that assumes a known cell ID (e.g., last camped cell identifier (ID) information was acquired within a recent time frame), to a second state that assumes a known country (e.g., last camped cell ID information was acquired within a less recent time frame), to a third state that assumes an unknown location (e.g., last camped cell ID information was not acquired within a recent time frame). In some embodiments, transitioning from the first state to the second state and from the second state to the third state may be based (or triggered by) a change in device motion state. In some embodiments, transitioning from the first state to the second state and from the second state to the third state may be based (or triggered by) a duration of time spent in an out of service condition. Note that the duration of time may be both variable (e.g., duration required to transition from first state to second state may be independent of, and different from, the duration required to transition from the second state to the third state) and configurable.

In some embodiments, for each scan attempt, a device may prioritize scan frequencies based on one or more criteria. For example, a device may prioritize a more recently refreshed database over a less recently refreshed database (e.g., prioritize a local ACQ-DB over an assisted ACQ-DB if a timestamp of the local ACQ-DB is more recent than a timestamp of the assisted ACQ-DB). As another example, a device may prioritize frequencies in a first location assisted database over frequencies in a second location assisted database where the second location assisted database includes a larger region about the device as compared to the first location assisted database. In some embodiments, a device may utilize an ordered priority list, such as prioritizing frequencies in the order of registered PLMN (RPLMN)/equivalent PLMN (ePLMN) lists, HPLMN/equivalent HPLMN (eHPLMN) lists, preferred PLMNs, other PLMN's excluding forbidden PLMNs (FPLMNs), and FPLMN list. In some embodiments, a device may prefer coverage band frequencies based on the location. In addition, a device may remove duplicate entries found on multiple PLMN lists. In some embodiments, a device may include most favorable frequencies in each scan. In some embodiments, a device may scan through all the identified frequencies through an algorithm (configurable), e.g., priority based, round robin, random, and so forth. In some instances, e.g., in complete out of coverage instances, a device may limit a number of frequencies for each scan attempt to a configurable number (e.g., 5, 10, 15, 20, and so forth to estimate power cost prior to attempting a full scan of available frequencies.

Figure 5A:
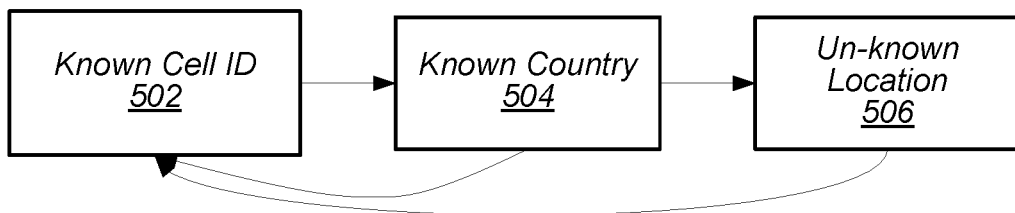
FIG. 5A illustrates a state machine with multiple states representing exemplary scan scopes, according to some embodiments.
Figure 5B:
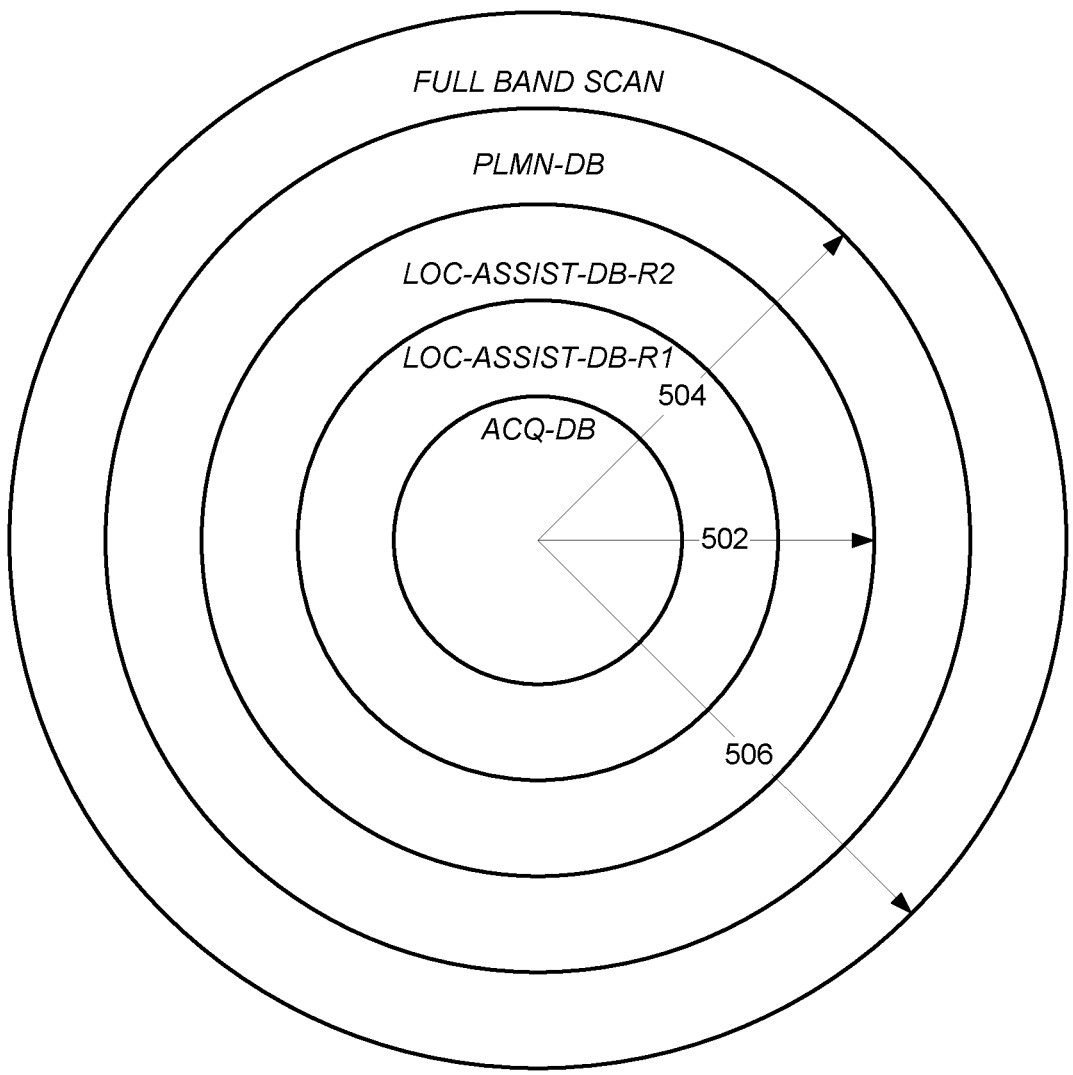
FIG. 5B illustrates scan scope relationships corresponding to the various states illustrated in FIG. 5A, according to some embodiments.

In some embodiments, a device may prioritize scans to recover service and to limit scan scope, e.g., attempt to find any cell. For example, as illustrated in FIGS. 5A and 5B, a device may attempt to move from a condition (or state) of unknown location to a known cell ID in order to limit scan scope. In particular, FIG. 5A illustrates a state machine with multiple states representing exemplary scan scopes, according to some embodiments. FIG. 5B illustrates scan scopes relationships corresponding to the various states illustrated in FIG. 5A, according to some embodiments.

As show, a device may start in, or assume, an initial state 502 (known cell ID) corresponding to an initial scan scope as illustrated in FIG. 5B. If the device determines that the last camped (e.g., last known) cell ID is not very recent (e.g., is greater than x minutes old), then the device may transition to state 504 (known country) corresponding to an expanded scan scope as illustrated in FIG. 5B. If the device determines that the last camped cell ID is not recent (e.g., is greater than y minutes old where y is greater than x), the device may transition to state 506 (un-known country) corresponding to a further expanded scan scope as illustrated in FIG. 5B. However, if the device finds (or obtains) a cell ID, the device may transition back to state 502 from either state 504 or 506. In other words, once the device has a recent cell ID, the device may limit scanning to the scope corresponding to state 502.

In some embodiments, when a device is in a connected mode but out of service (COOS), the device may limit scan scope to frequencies from ACQ-DB (local and/or shared, if available) and eACQ-DB (local and shared) as well as location assisted databases. In addition, the device may filter frequencies that correspond to a last registered PLMN and its corresponding ePLMN. In other words, the device may limit scans to frequencies that correspond to the last registered PLMN and its corresponding ePLMN. In some embodiments, the device may not scan for other PLMN frequencies as cellular network cannot recover the previous radio connection with non-roaming partner's networks. In some embodiments, the device may introduce a telescoping gap between each scan attempt while maintaining a previous radio connection context. In other words, the device may increase and/or decrease a time between scan attempts for frequencies while maintaining the previous radio connection context. In some embodiments, the time between scan attempts may be based, at least in part, on a motion state (current or averaged over a time period) of the device.

In some embodiments, when a device is camped on (e.g., connected to) limited service on a visiting PLMN (VPLMN), the device may perform a system scan by limiting limit scan scope to frequencies from ACQ-DB (local and/or shared, if available) and eACQ-DB (local and shared) as well as location assisted databases. In addition, the device may filter frequencies that correspond to HPLMN/eHPLMN/PPLMN (e.g., PLMNs which provide normal (not limited) service). In other words, the device may limit scans to frequencies that correspond to HPLMN, eHPLMN, and/or PPLMN. In some embodiments, the device may introduce a telescoping gap between each scan attempt while maintaining a previous radio connection context. In other words, the device may increase and/or decrease a time between scan attempts for frequencies. In some embodiments, the time between scan attempts may be based, at least in part, on a motion state (current or averaged over a time period) of the device.

In some embodiments, when a device is camped on (e.g., connected to) a VPLMN, the device may perform a HPPLMN scan by limiting a scan scope to the frequencies from the databases ACQ-DB and its neighbors, and location assisted databases. In addition, the device may filter frequencies from ACQ-DB (local and/or shared, if available) and eACQ-DB (local and shared) as well as the location assisted databases. In addition, the device may filter frequencies that correspond to HPLMN/eHPLMN/PPLMN. In some embodiments, the device may introduce a telescoping gap between each scan attempt while maintaining a previous radio connection context. In other words, the device may increase and/or decrease a time between scan attempts for frequencies. In some embodiments, the time between scan attempts may be based, at least in part, on a motion state (current or averaged over a time period) of the device.

Note that although the embodiments described herein have been described in reference to a lower power device (e.g., an accessory device), the embodiments may be implemented on any type of device. In other words, the embodiments described herein are not limited to lower power devices and may be implemented on standard form factor devices as described above.

Figure 6:
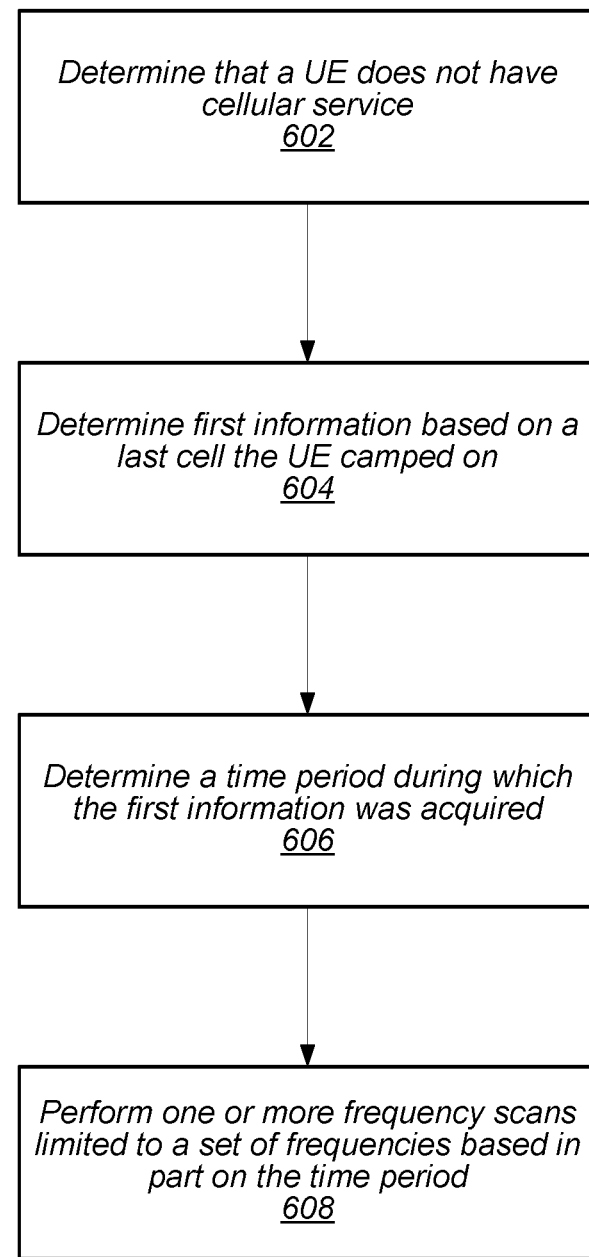
FIG. 6 is a flowchart diagram illustrating a method to determine scan scope, according to some embodiments.

FIG. 6—Flowchart Diagram

FIG. 6 is a flowchart diagram illustrating a method to determine scan scope, according to some embodiments. The method shown in FIG. 6 may be used in conjunction with any of the systems or devices shown in the above Figures, among other devices. In addition, the method shown in FIG. 6 may be used in conjunction with any of the embodiments and/or techniques described above. In various embodiments, some of the method elements shown may be performed concurrently, in a different order than shown, or may be omitted. Additional method elements may also be performed as desired. As shown, this method may operate as follows.

At 602, the UE (e.g., UE 107 or UE 106) may determine that the UE does not have cellular service. The lack of cellular may be due to various conditions as described above.

At 604, the UE may determine first information based, at least in part, on a last cell the UE camped on. In some embodiments, the first information may be a cell ID as described above.

At 606, the UE may determine a time period during which the first information was acquired. In other words, the UE may determine how recent the first information is, e.g., whether it was acquired within a first, second, or third time period. For example, the UE may determine whether the first information was acquired within 1 hour, 4 hours, or 8 hours of a current time. Note that these values are exemplary only, and other values/time periods (e.g., as described above) are contemplated.

At 608, the UE may perform one or more frequency scans limited to a set of frequencies based in part on the time period. In some embodiments, the set of frequencies may include frequencies stored on the UE in a local acquisition database (ACQ-DB) and/or a local enhanced ACQ-DB as well as a local assisted ACQ-DB or local assisted enhanced ACQ-DB. In some embodiments, the set of frequencies may include frequencies stored in location assisted databases. In some embodiments, to perform the one or more frequency scans, the UE is may scan frequencies stored in a first database associated with a first time stamp prior to scanning frequencies stored in a second database associated with a second time stamp, where the first time stamp is more recent than the second time stamp. In some embodiments, the UE may increase a time period between the one or more frequency scans based, at least in part on a mobility state of the UE.

In some embodiments, to determine the time period, the UE may determine whether the time period is less than a first value. In such embodiments, if the time period is less than the first value, the set of frequencies may include a first set of frequencies. In addition, if the time period is greater than the first value but less than a second value, the set of frequencies may include the first set of frequencies and a second set of frequencies and if the time period is greater than the second value, the set of frequencies may include the first and second sets of frequencies and a third set of frequencies.

In some embodiments, the UE may receive a system information block (SIB) from the last cell and the SIB may contain neighbor cell frequencies. The UE may store the neighbor cell frequencies in a local enhanced ACQ-DB and the set of frequencies may include frequencies stored in the local enhanced ACQ-DB.

In some embodiments, the UE may receive, from a companion UE (e.g., via local connection such as a Bluetooth, Wi-Fi, or other peer-to-peer connection), a local assisted ACQ-DB and the set of frequencies may include frequencies stored on the UE in the local assisted ACQ-DB.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device, comprising:
at least one antenna for performing wireless communications;
a radio coupled to the at least one antenna; and
a processing element coupled to the radio;
wherein the processing element is configured to cause the UE to:
perform one or more frequency scans limited to a first set of frequencies based on determining that first information associated with a last cell the UE camped on was acquired within a first time period; and
perform one or more frequency scans limited to a second set of frequencies based on determining that the first information was not acquired within the first time period, wherein the first set of frequencies is a subset of the second set of frequencies.

2. The UE of claim 1,
wherein the first set of frequencies include frequencies stored in one or more of a local acquisition database (ACQ-DB), a local enhanced ACQ-DB, or a location assisted database.

3. The UE of claim 1,
wherein the first set of frequencies is limited to frequencies corresponding to a home public land mobile network (PLMN), equivalents of the home PLMN, and a provider preferred PLMN.

4. The UE of claim 1,
wherein the first set of frequencies include frequencies corresponding to the last cell.

5. The UE of claim 4,
wherein the frequencies corresponding to the last cell include frequencies of a last registered public land mobile network (RPLMN) database.

6. The UE of claim 1,
wherein the processing element is further configured to cause the UE to:
determine that the UE is camped on a visiting public land mobile network (VPLMN).

7. The UE of claim 1,
wherein the processing element is further configured to cause the UE to:
determine that the first information was not acquired within a second time period, wherein the second time period is greater than the first time period; and
in response to determining that the first information was not acquired within the second time period, perform one or more frequency scans limited to a third set of frequencies, wherein the second set of frequencies is a subset of the third set of frequencies.

8. The UE of claim 1,
wherein in the processing element is further configured to cause the UE to:
receive a system information block from the last cell, wherein the system information block contains neighbor cell frequencies; and
store the neighbor cell frequencies in a local enhanced acquisition database (ACQ-DB); and
wherein the second set of frequencies include frequencies stored in the local enhanced ACQ-DB.

9. The UE of claim 1,
wherein the processing element is further configured to cause the UE to:
receive, from a companion UE, a local assisted acquisition database (ACQ-DB), wherein the second set of frequencies include frequencies stored on the UE in the local assisted ACQ-DB.

10. A non-transitory computer accessible memory medium comprising program instructions which, when executed at a wireless user equipment (UE) device, cause the UE to:
perform one or more frequency scans limited to a first set of frequencies based on determining that first information associated with a last cell the UE camped on was acquired within a first time period; and
perform one or more frequency scans limited to a second set of frequencies based on determining that the first information was not acquired within the first time period, wherein the first set of frequencies is a subset of the second set of frequencies.

11. The non-transitory computer accessible memory medium of claim 10,
wherein the first set of frequencies include frequencies stored in one or more of a local acquisition database (ACQ-DB), a local enhanced ACQ-DB, or a location assisted database.

12. The non-transitory computer accessible memory medium of claim 10,
wherein the first set of frequencies is limited to frequencies corresponding to a home public land mobile network (PLMN), equivalents of the home PLMN, and a provider preferred PLMN.

13. The non-transitory computer accessible memory medium of claim 10,
wherein the first set of frequencies include frequencies corresponding to the last cell.

14. The non-transitory computer accessible memory medium of claim 10,
wherein the second set of frequencies include frequencies stored in location assisted databases stored on the UE.

15. The non-transitory computer accessible memory medium of claim 10,
wherein the frequencies corresponding to the last cell include frequencies of a last registered public land mobile network (RPLMN) database.

16. An apparatus, comprising:
a memory; and
a processing element in communication with the memory, wherein the processing element is configured to:
perform one or more frequency scans limited to a first set of frequencies based on determining that first information associated with a last cell a user equipment device (UE) camped on was acquired within a first time period; and perform one or more frequency scans limited to a second set of frequencies based on determining that the first information was not acquired within the first time period, wherein the first set of frequencies is a subset of the second set of frequencies.

17. The apparatus of claim 16,
wherein the first set of frequencies include frequencies stored in one or more of a local acquisition database (ACQ-DB), a local enhanced ACQ-DB, or a location assisted database.

18. The apparatus of claim 16,
wherein the first set of frequencies is limited to frequencies corresponding to a home public land mobile network (PLMN), equivalents of the home PLMN, and a provider preferred PLMN.

19. The apparatus of claim 16,
wherein the first set of frequencies include frequencies corresponding to the last cell.

20. The apparatus of claim 16,
wherein the second set of frequencies include frequencies stored in location assisted databases stored on the UE.

* * * * *